United States Patent [19]

Jeffers et al.

[11] Patent Number: 5,036,537
[45] Date of Patent: Jul. 30, 1991

[54] GEOGRAPHIC BLACK-OUT METHOD FOR DIRECT BROADCAST SATELLITE SYSTEM

[75] Inventors: John M. Jeffers, Downsview; S. Wayne Mundy, Brampton; Stephen P. Knight, Markham, all of Canada

[73] Assignee: General Instrument Corp., New York, N.Y.

[21] Appl. No.: 36,159

[22] Filed: Apr. 3, 1987

Related U.S. Application Data

[63] Continuation of Ser. No. 672,925, Nov. 19, 1984, abandoned.

[51] Int. Cl.⁵ .............................................. H04H 1/00
[52] U.S. Cl. ...................................... 380/20; 358/349
[58] Field of Search ...................... 380/20, 21, 43, 48; 358/349; 455/2, 3-5, 31-33, 12

[56] References Cited

U.S. PATENT DOCUMENTS

| | | | |
|---|---|---|---|
| 3,716,654 | 2/1973 | Hendrickson et al. | 455/2 |
| 4,292,650 | 9/1981 | Hendrickson | 358/114 |
| 4,323,921 | 4/1982 | Guillou | 358/114 |
| 4,337,483 | 6/1982 | Guillou | 358/114 |
| 4,354,201 | 10/1982 | Sechet et al. | 358/114 |
| 4,484,027 | 11/1984 | Lee et al. | 178/22.13 |
| 4,494,142 | 1/1985 | Mistry | 358/114 |
| 4,531,020 | 7/1985 | Wechselberger et al. | 358/122 |
| 4,536,791 | 8/1985 | Campbell et al. | 358/122 |

Primary Examiner—Stephen C. Buczinski
Assistant Examiner—Bernarr E. Gregory
Attorney, Agent, or Firm—James & Franklin

[57] ABSTRACT

Television programs are broadcast to a plurality of receiver units in various geographic areas. Each unit has a memory for storage of a designation code representative of its location and a memory for the storage of a blackout tier indication. Prior to the transmission of the program to be blacked out, each unit is separately addressed and provided with a message including a designation code for storage. Then, a globally addressed message provides all receiver units having a selected designation code with a blackout tier indication for storage. A program tier indication is transmitted along with the program to be blacked out. Each unit, upon receiving the transmitted program, compares the transmitted program tier indication and the blackout tier indication in its memory. All receiver units having a stored blackout tier indication which matches the program tier indication are simultaneously prevented from displaying the program to be blacked out.

11 Claims, 6 Drawing Sheets

GEOGRAPHIC BLACK-OUT METHOD FOR DIRECT BROADCAST SATELLITE SYSTEM

This application is a continuation of U.S. patent application Ser. No. 672,925 filed Nov. 19, 1984 and now abandoned.

The present invention relates to direct broadcast satellite systems and, more particularly, to a geographic blackout method for use with such systems in which all receiver units within a given geographic area are simultaneously prevented from displaying a program to be blacked out through the use of a single command sequence.

The availability of small, low-cost television receive-only terminals in recent years has resulted in an increasing demand for direct broadcast satellite services. Such services include Pay-TV, tele-conferencing, tele-seminar, private broadcast networks, and the like.

Unlike land lines and terrestrial microwave links, satellite transmissions lack privacy. Such transmissions can be received by any TV receive-only terminal whose antenna is situated to receive the satellite signals. Accordingly, secure transmission of video and audio programming and data signals is required to provide the privacy essential to many applications.

A simple example of a direct broadcast satellite network in which security is required is one which broadcasts television signals to paying subscribers. Since any receiver having an antenna in the broadcast area can receive the satellite signals, it is necessary that the signals be coded in a way which can be decoded only by the subscriber's receivers. Certain subscribers may have paid for certain programs or program groups, whereas others may have paid for other programs or program groups. The signals must then be further encoded such that subscribers who have paid for particular programs or groups of programs can receive same, while other subscribers cannot.

In addition, it may be desirable to design the system such that a particular subscriber can preview a program and then decide whether he or she wishes to watch the program and, hence, pay for the privilege. In such an impulse pay-per-view system, the decision of the subscriber must be recorded and communicated to a billing facility for appropriate billing. In such instances, the control signals to the subscriber's receiver instructing the receiver how to communicate with the billing office must be secure in order to eliminate the possibilities of theft of the service.

In the direct broadcast satellite system in which the present invention is used, programming is distributed through a composite television signal which includes a plurality of levels of programming called tiers. Each tier carries a different variety of programming. A particular program may suit several tiers, much like a library index card listing having several possible topics of interest. Thus, a particular program may appear on one or more tiers.

Each tier is assigned a number. The tier number is represented by a bit stream. The bit stream is a series of zeros with a one at the bit corresponding to the tier number. This is referred to herein as the tier indication. If there are, for example, thirty-two tiers, tier number three is represented by a bit stream of two zeros, a one, and twenty-nine zeros. Each program is distributed along with a program tier indication which is a similar bit stream with a one for the bit corresponding to the tier on which it is distributed. The program and the accompanying program tier indication are distributed to all receiver units.

Certain programs, whether paid for by subscription or on an impulse pay-per-view basis, may be considered by the subscriber as inappropriate for viewing by the household or certain members thereof. Such programs may, for instance, include violent or sexually explicit movies or the like. It is therefore desirable that the satellite system incorporate a means for blocking out the tiers on which such programs are distributed so that they cannot be decoded and displayed by the subscriber's receiver unit. It is preferable that objectionable programming be blocked even if the receiver unit is instructed to display the program as a pay-per-view item. One way to achieve this is to control individual receiver units by the system operator from the transmission end to block programs and provide a mechanism whereby the program tiers designated for blocking can be changed upon written or telephone communication by the subscriber with the system operator.

Further, there are certain instances where it is necessary to black out programming in a particular geographic area. For example, certain sporting events such as baseball games, football games, boxing matches, and the like, are provided to the satellite network for broadcast with the restriction that they not be distributed within the locality in which the sporting event is taking place, so as not to adversely affect attendance at the arena. It is therefore necessary that the satellite network have capability for blacking out selected programming in certain designated geographic areas.

In broadcast television, local blackouts are achieved simply by not broadcasting the program over any local affiliate television station in the area to be blacked out. In a direct broadcast satellite delivery system, local area blackouts may be achieved by selectively addressing each subscriber receiver unit in the subject geographic area and then selectively preventing each of the addressed subscriber receiver units from displaying the particular program.

However, since there may be a great many (perhaps millions) different subscriber receiver units located within the geographic area to be blacked out, it may require many minutes or more to sequentially address all of them to achieve the appropriate blackout. A significant time lag, that is, more than tens of seconds, is undesirable since the program prior to the event to be blacked out is typically not blacked out. Thus, if the blackout sequence is begun prior to the transmission of the program to be blacked out, portions of the prior program will also be blacked out. On the other hand, if the sequence is begun at the beginning of the program to be blacked out, subscribers may find it objectionable to receive a portion of the local event and then to observe that the program is being blacked out.

In the direct broadcast satellite system in which the present invention is employed, each receiver unit is provided with a memory for storage of a designation code representing its geographic location, and a memory for storage of indications of tiers upon which programs to be blacked out are to be distributed. This latter memory is referred to as the blackout memory and stores the blackout tier indications.

After each receiver unit is provided with a designation code, the receiver units are globally addressed. Each receiver unit having a selected designation code stored therein is provided with a blackout tier indication for storage. When a program is selected for viewing, the receiver unit compares the program tier indication distributed with the program and the stored blackout tier indication. If the indications match, the selected program cannot be displayed.

Thus, the present invention relates to a method designed for use in a direct broadcast satellite system where, in response to a single command sequence (program tier indication) from the transmission end, all previously defined receiver units (having a stored blackout tier indication matching the program tier indication) may be simultaneously prevented from displaying a particular program. This method is particularly suitable for blacking out programs in selected geographic areas, but may be applied for other purposes. Because the method is particularly suitable for geographic blackouts, it will be described herein as applied to that purpose. However, the invention should not be construed as limited thereto.

It is, therefore, a prime object of the present invention to provide a method for use in a direct broadcast satellite system for simultaneously blacking out a program for all receivers in a designated geographic area.

It is another object of the present invention to provide a method for use in a direct broadcast satellite system for simultaneously blacking out a program wherein each receiver unit is provided with a storable designation code representing the geographic area in which the unit is located.

It is another object of the present invention to provide a method for use in a direct broadcast satellite system for simultaneously blacking out a program for all receivers in a particular geographic area wherein blackout tier indications are globally distributed for storage in all receiver units having a particular stored designation code.

It is another object of the present invention to provide a method for use in a direct broadcast satellite system for simultaneously blacking out a program for all receivers in a particular geographic area in which the program to be blacked out is broadcast with a program tier indication and all receivers having a stored blackout tier indication matching the transmitted program tier indication are prevented from displaying the program.

In accordance with one aspect of the present invention, a method for simultaneously preventing the display of a program by selected receivers is provided for use in a direct broadcast satellite system. The system is of the type including a plurality of receiver units, some of which are selected as being unable to display a given program. Each unit comprises a memory. Prior to the transmission of a program which cannot be displayed by selected units, each unit is addressed and provided with a designation code for storage in its memory. All receiver units are then addressed and those having a selected designation code stored therein are provided with given indication for storage. Each program is transmitted with an associated program indication. Each of the receiver units, upon receiving a transmitted program, compares the program indication transmitted with the program and the stored indication. Receiver units having a stored indication matching the transmitted program indication are unable to display the transmitted program.

Each of the receiver units has a unique address code. An address code is transmitted with the encrypted message including the designation code. A particular receiver unit can decrypt the encrypted message only if the transmitted address code transmitted therewith matches the address code of the receiver.

All receiver units can be addressed using a global address. The global address is transmitted with a message containing the selected designation code and given indication. Each receiver having a stored designation code matching the designation code in the message stores the given designation in the message.

The given indication comprises a plurality of bits. The memory comprises a bit map memory.

In accordance with another aspect of the present invention, a method for simultaneously blacking out a program from all receiver units in a selected geographic area is provided for use in a direct broadcast satellite system. The system is of the type including a plurality of receiver units in various geographic areas. Each receiver unit has a designation code memory and a blackout tier memory. Each receiver unit is separately addressed and provided with a designation code for storage in its designation code memory. Different designation codes represent different geographic areas. Each designation code is selected in turn, and for each designation code, a blackout tier indication is provided for storage in the blackout tier memory of each receiver unit having a matching designation code stored in its designation code memory. A signal is transmitted to all receiver units including various programs, each of which is accompanied by a program tier indication. Each receiver unit, upon receiving the transmitted signal, compares the program tier indication accompanying each program with the blackout tier indication in its blackout tier memory. Any receiver unit having a stored blackout tier indication corresponding to the transmitted program tier indication accompanying a program is unable to display that program.

The transmitted signal includes a data stream. The data stream includes a plurality of addressable portions. The blackout tier indication is provided by generating an addressable portion addressed to all receiver units commanding all receiver units having a given stored designation code to store the blackout tier indication in the addressed portion.

Each of the receiver units has a unique address. Each receiver unit is addressed by incorporating the address thereof in the addressable portion which includes the designation code for the addressed receiver unit, as well as a message for the receiver unit to enter the designation code into its designation code memory.

In accordance with another aspect of the present invention, a receiver unit is provided for use in a direct broadcast satellite system. The system includes a plurality of receiver units and a transmission station for generating a composite television signal including program information including programs on a plurality of tiers, and an addressable data stream including program tier indications for each program tier, designation code information addressable to a particular receiver unit, and globally addressed blackout tier indications, the receiver comprising means for receiving the composite television signal, means for locating the portion of the addressable data stream containing the designation code information addressed to the receiver unit, means for storing the designation code information, means for locating the globally addressed blackout tier indication corresponding to the stored designation code information, means for selecting a program for display, means for obtaining the program tier indication for the selected program, means for comparing the program tier indication with the stored blackout tier indication, and means for displaying the selected program if said compared indications do not match.

To these and to such other objects which may hereinafter appear, the present invention relates to a geographic blackout method for use in a direct broadcast satellite system as set forth in detail in the following specification and recited in the annexed claims, taken together with the accompanying drawings, wherein like numerals refer to like parts, and in which:

Figure 1:
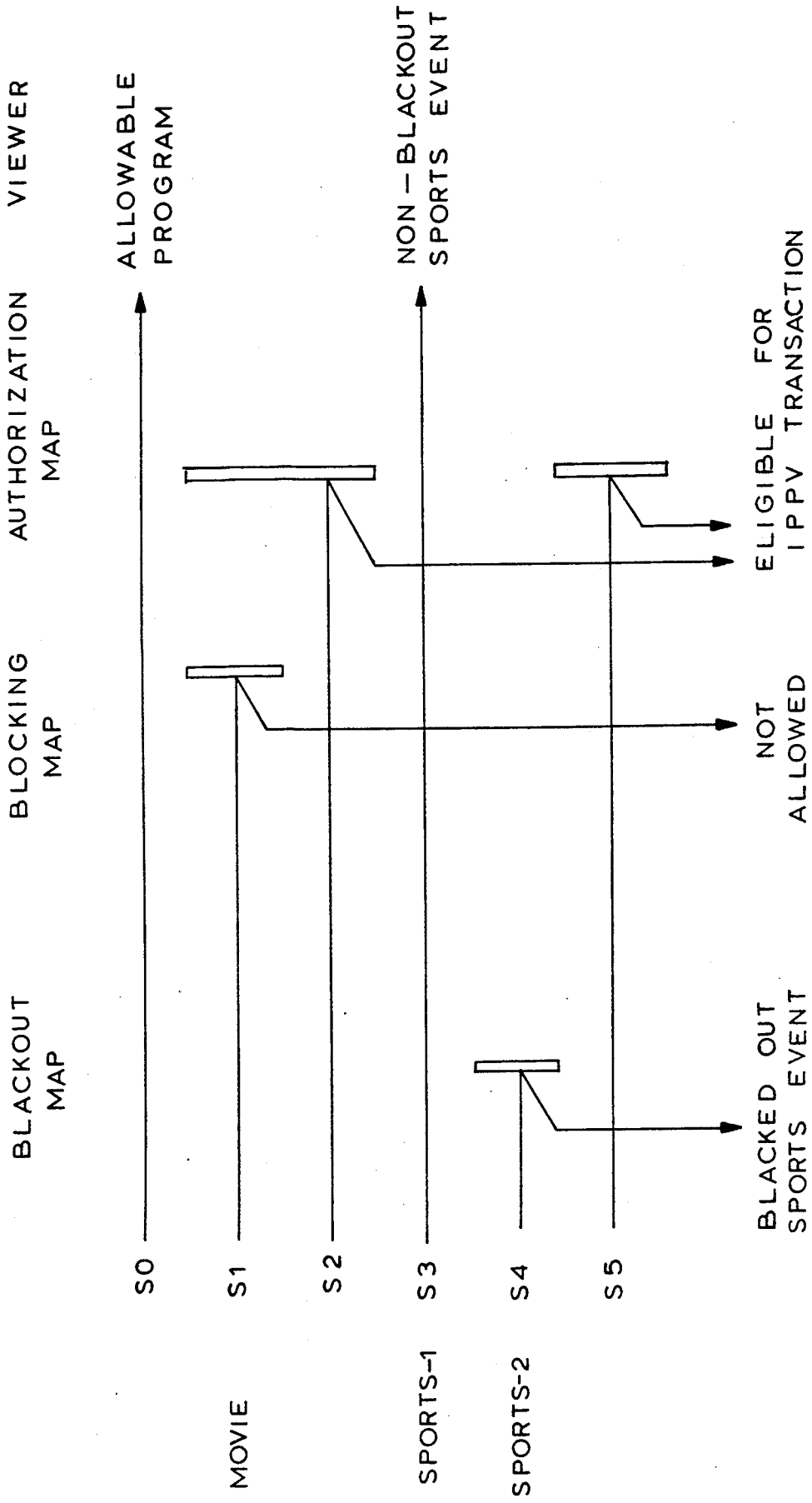
FIG. 1 is a diagram schematically representing the blackout bit map memory, the blocking bit map memory, and authorization bit map memory of a typical subscriber receiver unit of the present invention.

The details of the direct broadcast satellite network in which the blackout method of the present invention is employed, including an explanation of the transmission end equipment, the terminal end equipment, and the signal transmission system employed for communications between the two are set forth in co-pending U.S. patent application Ser. No. 4,599,647, issued July 8, 1986 in the names of Ashok George and John Jeffers, entitled "Receiver With Interface For Interaction With Controller-Decoder" and in U.S. Pat. No. 4,739,510, issued Apr. 19, 1988 in the names of Joseph Glaab, Donald Horne, John Jeffers, and Wayne Mundy, entitled "Direct Broadcast Satellite Signal Transmission System."

An explanation of the basic cryptographic method used in the direct broadcast satellite network disclosed above can be obtained from co-pending U.S. patent application Ser. No. 665,114 filed Oct. 26, 1984 in the name of Donald Horne, and entitled "Cryptographic System For Direct Broadcast Satellite Network." Certain improvements in the cryptographic system used in the direct broadcast satellite network can be obtained from co-pending U.S. patent application Ser. No. 710,385 filed Mar. 11,1985 in the names of Donald Horne and John Jeffers, entitled "Cryptographic System Using interchangeable Key Block and Selectable Key Fragments."

The reader is also referred to co-pending U.S. patent application Ser. No. 710,466 filed Mar. 11, 1985 in the name of Donald Horne, entitled "Program Blocking Method For Use In Direct Broadcast Satellite SysteM" which describes the use of a blocking bit map in a direct broadcast satellite system having impulse pay-per-view capability. All of the above-captioned applications are assigned to the assignee hereof.

The direct broadcast satellite network of the present invention is designed to supply television programming to a large number of subscriber receiver units distributed in various geographic areas. Each geographic area may have a large number of subscriber receiver units contained therein.

Each of the subscriber units is supplied, via satellite, with a number of different programming tiers. Each subscriber, upon entering the network, obtains a receiver unit which includes a signal tuner and modulation section and an addressable controller-decoder for use in conjunction with the subscriber's television.

Each subscriber chooses one or more of the programming tiers to be received on a subscription basis. The subscriber pays the system operator a periodic fee, for example monthly, which entitles him/her to view the programs on the tiers he/she has selected and paid for. Other tiers of programming can be paid for on impulse on a pay-per-view basis. Programs eligible for viewing on an impulse pay-per-view basis are previewable -by the subscriber by permitting the subscriber to view the beginning of the program, for example, the first five minutes thereof, after which the subscriber must decide whether to pay for the privilege of viewing the remainder of the program.

In order to view a program eligible for an impulse pay-per-view transaction, the subscriber enters a secret pass code on a keyboard associated with the tuning section of the receiver unit. The addressable controller-decoder connected therewith will enter certain information into a memory relating to the identification number of the program being viewed, the time and date of the viewing, and the cost which the subscriber will have to pay for the privilege of viewing the program. Periodically, the addressable controller-decoder will receive instructions from the system operator to forward the accumulated data relating to the previous impulse pay-per-view transactions and provide same to the system operator for billing purposes. This can be done in one of two ways. If the addressable controller-decoder has telephone communications capability, that is, provided with a modem connected to a telephone line, and the necessary circuitry to operate the modem, the controllable addressable decoder will call a computer located at the transmission end and, after the appropriate identification procedure, will transfer the information concerning the impulse pay-per-view transactions stored in the addressable controller-decoder memory to the computer at the transmission end. That computer will then periodically generate a bill which will be mailed to the subscriber.

If the addressable controller-decoder does not have telephone communications capability, a credit card type device can be utilized for billing purposes. The credit card type device is essentially a memory on a card which is inserted into a slot provided on the addressable controller-decoder. Upon receiving the appropriate commands from the transmission end, the addressable controller-decoder .will transfer its stored information concerning the impulse pay-per-view transactions onto the card memory. The subscriber will then mail the card memory to the system operator who will then access the card memory to ascertain the impulse pay-per-view transactions and provide the subscriber with a bill in accordance therewith.

Certain programming, whether eligible through subscription or through impulse pay-per-view transaction, must be prevented from display on designated receiver units. Such programming may incorporate content which is objectionable for some reason or may relate to particular programming, such as sporting events, which are taking place locally and must be blacked out. In order to maintain attendance at such sporting events at a high level, the program is distributed with the restriction that the program will not be viewable within the geographic area in which it is taking place.

The present invention relates to a method for preventing the display of selected programming by designated receiver units. It is particularly adaptable for use in simultaneously blacking out particular programs in designated geographic areas.

In order to black out all the receiver units in a particular geographic area, it is normally necessary to access each unit and provide same with the necessary blackout instructions. Since there may be hundreds of thousands or even millions of receiver units in a particular geographic area, accessing each unit in order to provide it with blackout information will require a relatively long time. If instructions to black out programming on a particular tier are distributed prior to the commencement of the program to be blacked out, this may interrupt the viewing of the prior program, which is normally not blacked out, a result which is to be avoided. On the other hand, if the distribution of the blackout command information does not take place until the program to be blacked out commences, certain viewers will be able to view the beginning portion of the program and will be blacked out a few minutes into the program, which may cause annoyance.

The present invention overcomes these problems by providing each receiver unit and, particularly the addressable controller-decoder portion thereof, with a blackout tier indication memory in the form of a blackout bit map memory and a receiver unit designation code memory. Each unit is addressed and provided with a designation code, in this case, a code which reflects the geographic location of the receiver unit. The designation code is stored in the unit. The units are then globally addressed and provided with a selected designation code and a blackout tier indication. The blackout tier indication represents a particular programming tier to be blacked out on all receiver units having the selected designation code. If the stored designation code matches the designation code being transmitted, the blackout tier indication is stored in the receiver blackout bit map memory. This takes place prior to the transmission of the program to be blacked out.

Each program is transmitted in association with a program tier indication. If the program is to be blacked out in a particular geographic area represented by a given designation code, the program tier indication will match the blackout tier indication previously stored in all receiver units having that stored designation code. Upon receiving a program, each receiver unit compares the program tier indication transmitted therewith and the blackout tier indication in its blackout bit map memory. If the indications match, the program cannot be displayed. Otherwise, the program is displayed as usual. Thus, all receivers in a selected geographic area will be blacked out to be prevented from displaying the program.

Each receiver unit also has a tier authorization memory in the form of an authorization bit map memory and a tier blocking memory in the form of a blocking bit map memory. Indications relating to programming tiers not selected for subscription are stored in the authorization bit map memory. Indications relating to tiers to be blocked by the system operator are stored in the blocking bit map memory. Authorization tier indications and blocking tier indications are distributed in addressable portions of the data stream in the composite television signal in the same way as the designation code.

While the various bit map memory facilities are referred to herein as separate memories, it should be understood that same may, in reality, be different areas of the same memory circuit.

FIG. 1 graphically depicts the manner in which the authorization bit map memory, blocking bit map memory, and blackout bit map memory are utilized within the addressable controller-decoder. Each bit map is an array of bits equal to the number of programming tiers, for example, 32 bits corresponding to 32 programming tiers. Thus, each bit represents a tier. Each bit in each array is tested with each corresponding bit in each other array to determine whether programming on a selected tier may be displayed.

Only six tiers of programming, $S_0..S_5$, are shown for purposes of illustration, but it is understood that many more tiers of programming can be utilized. Programming tiers $S_0$ and $S_3$ are programming tiers which have been paid for by subscription and contain, for example, commercial programming which can be viewed without further action on the part of the subscriber.

Programming tiers $S_1$ and $S_2$, for example, contain "R" rated and "PG" rated movies thereon, respectively. Both programming tiers $S_1$ and $S_2$ are eligible for impulse pay-per-view transactions as the addressable controller-decoder has previously received instructions authorizing the viewing of these tiers on this basis. However, the subscriber does not wish to have certain members of the household view the "R" rated movies on programming tier $S_1$. This has been previously communicated to the system operator who has then provided the subscriber's addressable controller-decoder with particular commands such that the blocking bit map contained in the subscriber's addressable controller-decoder memory has been set to block the display of programming tier $S_1$, even if the appropriate passcode is entered into the controller which would normally permit the subscriber unit to display the program and charge the subscriber for the privilege.

Programming tiers $S_3$ and $S_4$ contain sports programs thereon. Programming tier $S_3$, like tier $S_0$, is part of the subscription and, hence, need not be authorized for impulse pay-per-view transactions. It is not blocked or blacked out and, therefore, can be viewed. However, the programming on tier $S_4$ has been blacked out of the geographic area in which the subscriber unit is situated. Accordingly, the addressable controller-decoder will not permit the programming on tier $S_4$ to be displayed.

The programming on tier $S_5$, like the programming on tier $S_2$, is eligible for impulse pay-per-view transactions. Since this programming has not been blocked and has not been blacked out, it can be viewed by the entrance of the appropriate passcode at the keyboard of the receiver unit. The program will then be displayed and the subscriber charged for the privilege.

Control data is distributed to the subscriber units through a data stream which is situated in consecutive horizontal blanking intervals within the composite television broadcast signal. The data stream is described in detail below In general, the data stream includes a header packet which contains a group address, certain program related information, including a program tier indication for each program being distributed, and certain impulse pay-per-view information such as an identification number relating to a particular program eligible for an impulse pay-per-view transaction and the cost of viewing same. This type of information is generally applicable to all receiver units in the addressed group.

The data stream also includes a plurality of addressable packets containing encrypted messages applicable to the control of particular subscriber units within the addressed group. Each subscriber unit has an individual address number. An addressable packet is addressed to a particular subscriber unit by including therein the subscriber unit's individual address number. Only the subscriber unit with that individual address number can receive and decode the message in that addressed packet.

The addressed packet may contain a selected one of several different messages along with the information necessary for the particular addressed subscriber unit to decode the message. For example, a particular message may cause the addressed subscriber unit to load a designation code into its designation code memory. Another message may cause the storage of blackout tier indications into a blackout bit map memory. Other messages may cause an addressed receiver unit to be provided with authorization tier indications to set its authorization bit map memory, or with blocking tier indications to set its blocking bit map memory.

It is also possible to utilize an addressable packet to send a global message, that is, a message applicable to the control of all receiver units within the addressed group. The global message is sent in clear or unencrypted form. In this case, a global address, for example all ones, is utilized. Such a message, for instance, may be a command for all subscriber units in the group having a particular stored designation to perform a certain function.

The system of the present invention is initialized by separately addressing each subscriber unit in each group within the network and commanding each addressed subscriber unit to enter a particular designation code, contained within a message in the addressable packet, in its designation code memory. Different geographic areas are assigned different designation codes. Thus, all subscriber units in a particular geographic area will have the same designation code stored in their designation code memories.

Figure 2:
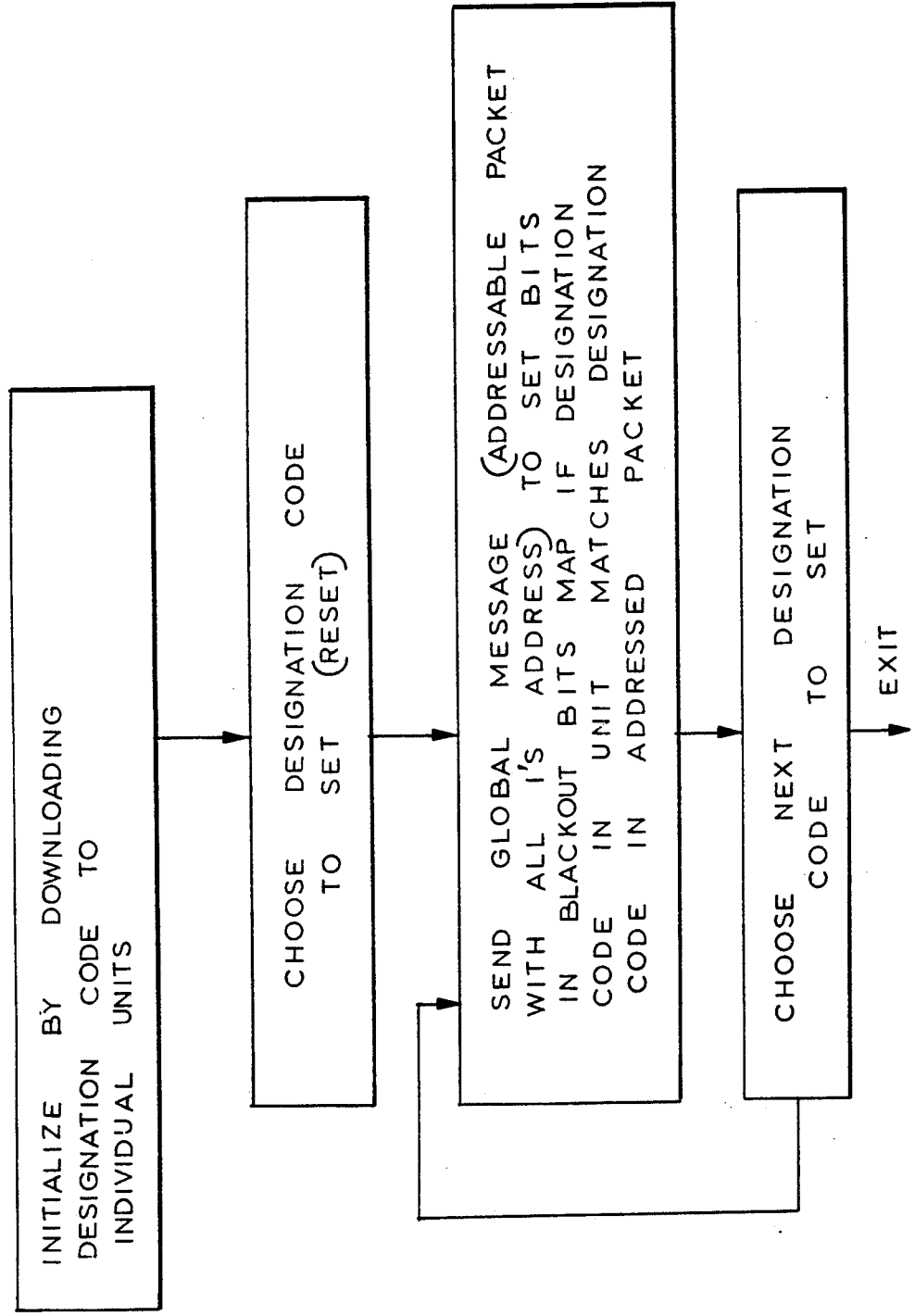
FIG. 2 is a flow chart of the procedure whereby the blackout code memories of the subscriber receiver units in various geographic areas are set and reset.

After the designation codes are stored in all subscriber units, each designation code is selected, in turn, and the blackout bit map memory of each subscriber unit having the selected designation code is set (or reset). This is accomplished by sending a global message in an addressable packet of the data stream in which a global address, such as a series of ones, is contained commanding all subscriber units in the system to load a particular sequence of bits, which form the blackout tier indication, into their blackout bit map memory if the designation code previously stored in the unit matches the designation code in the message. After this occurs, the next designation code will be selected and a global message will be sent instructing all subscriber units having that designation code to set or reset their respective blackout bit map memories with a particular blackout tier indication. The process continues until the blackout bit map memories of all receivers in each geographic area have been set. This is illustrated in FIG. 2.

Figure 3:
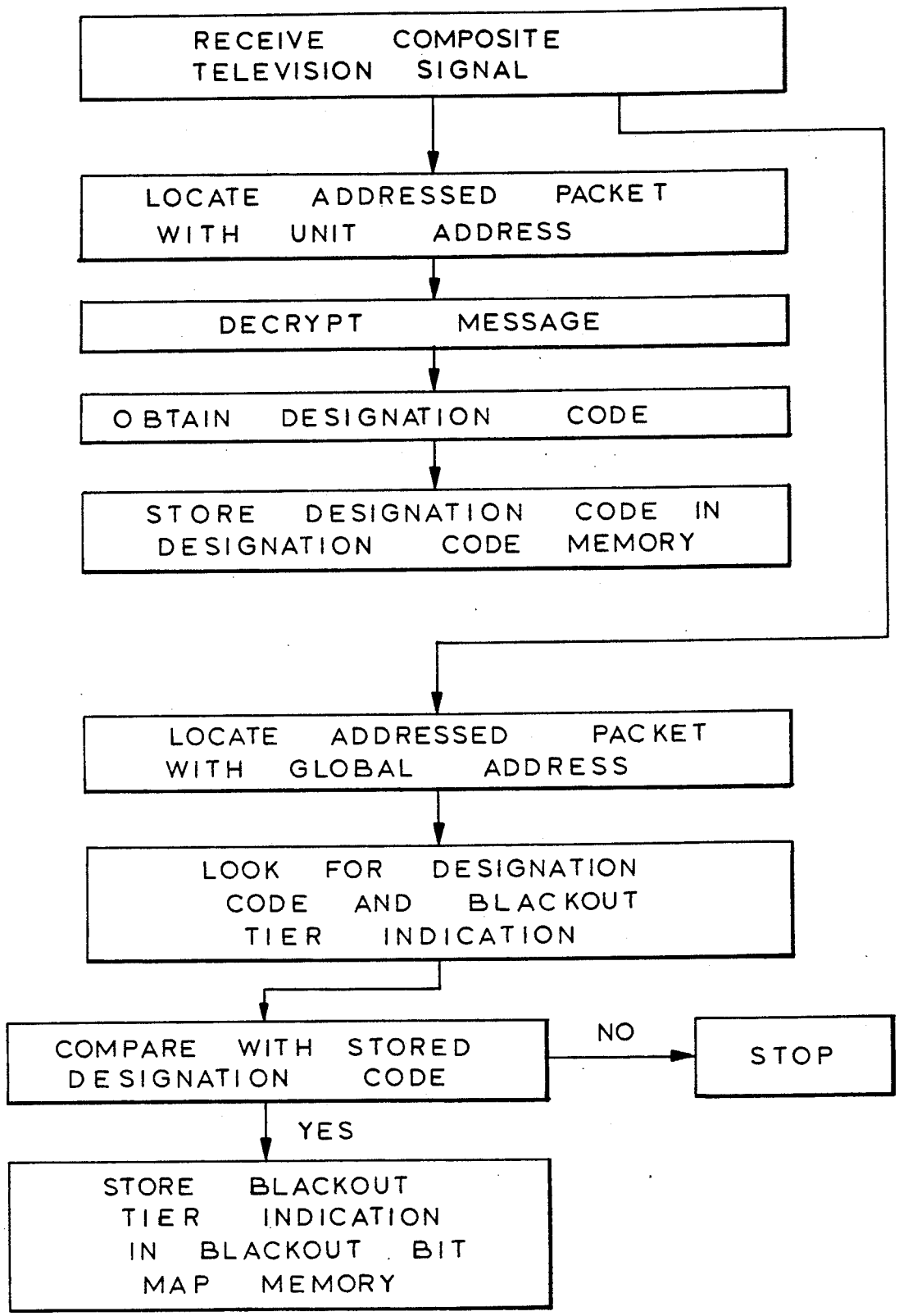
FIG. 3 is a flow chart of the operations of the receiver unit in setting its designation code memory and blackout bit map memory.

As illustrated in FIG. 3, each receiver unit receives the composite television signal and looks for an addressed packet with its unit address. Each addressed packet with a unit address contains a message type indication, an encrypted message, and decryption information. One message type represents a command to set the designation code memory with a designation code contained in the message. Other message types represent commands to set the authorization bit map memory, blocking bit map memory, or perform other functions. The receiver unit decrypts the message and performs the designated function, i.e., store the designation code in its designation code memory.

A global message, that is, an addressed packet with a global address will then be sent. The message contains a designation code and a blackout tier indication in clear or unencrypted form. If the stored designation code matches the designation code in the designation memory, the receiver unit will store the blackout tier indication in its blackout bit map memory.

Each program broadcast over the composite television signal has a header packet associated therewith which contains the program tier indication associated with that program.

Figure 4:
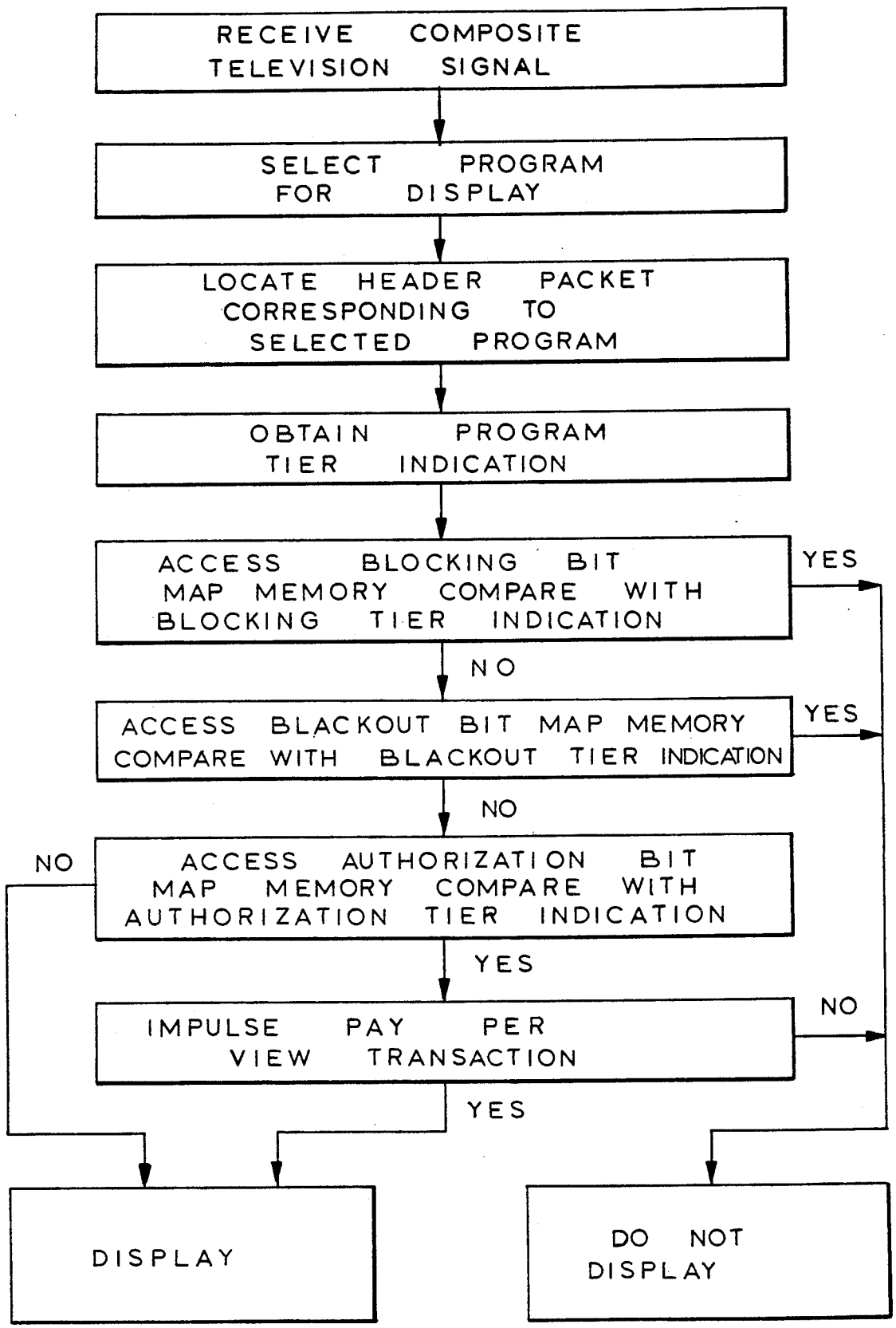
FIG. 4 is a flow chart of the operations which permit a subscriber receiver unit to decide whether a particular program should be blacked out.

As illustrated in FIG. 4, when the composite television signal is received by the subscriber unit, the subscriber will select a program for display. The subscriber unit located at the header packet in the addressable data stream corresponding to the selected program and obtains the program tier indication therein. The subscriber unit will then access its blocking bit map memory. It will compare the program tier indication from the header with the stored blocking tier indication. If the indications match, that is, if there is a "one" bit at the same location, the program will be blocked and cannot be displayed by the receiver unit.

Next, the blackout bit map memory will be accessed and the program tier indication compared with the blackout tier indication. If the indications match, that is, if there is a "one" bit in the program tier indication at the same location as the "one" bit in the blackout bit map memory, the program will not be displayed.

Finally, the authorization bit map memory is accessed. If the program tier indication matches the authorization tier indication, an impulse pay-per-view transaction must take place before the program can be viewed. Otherwise, the program is within the subscription and can be displayed without further action on the part of the subscriber.

Figure 5:
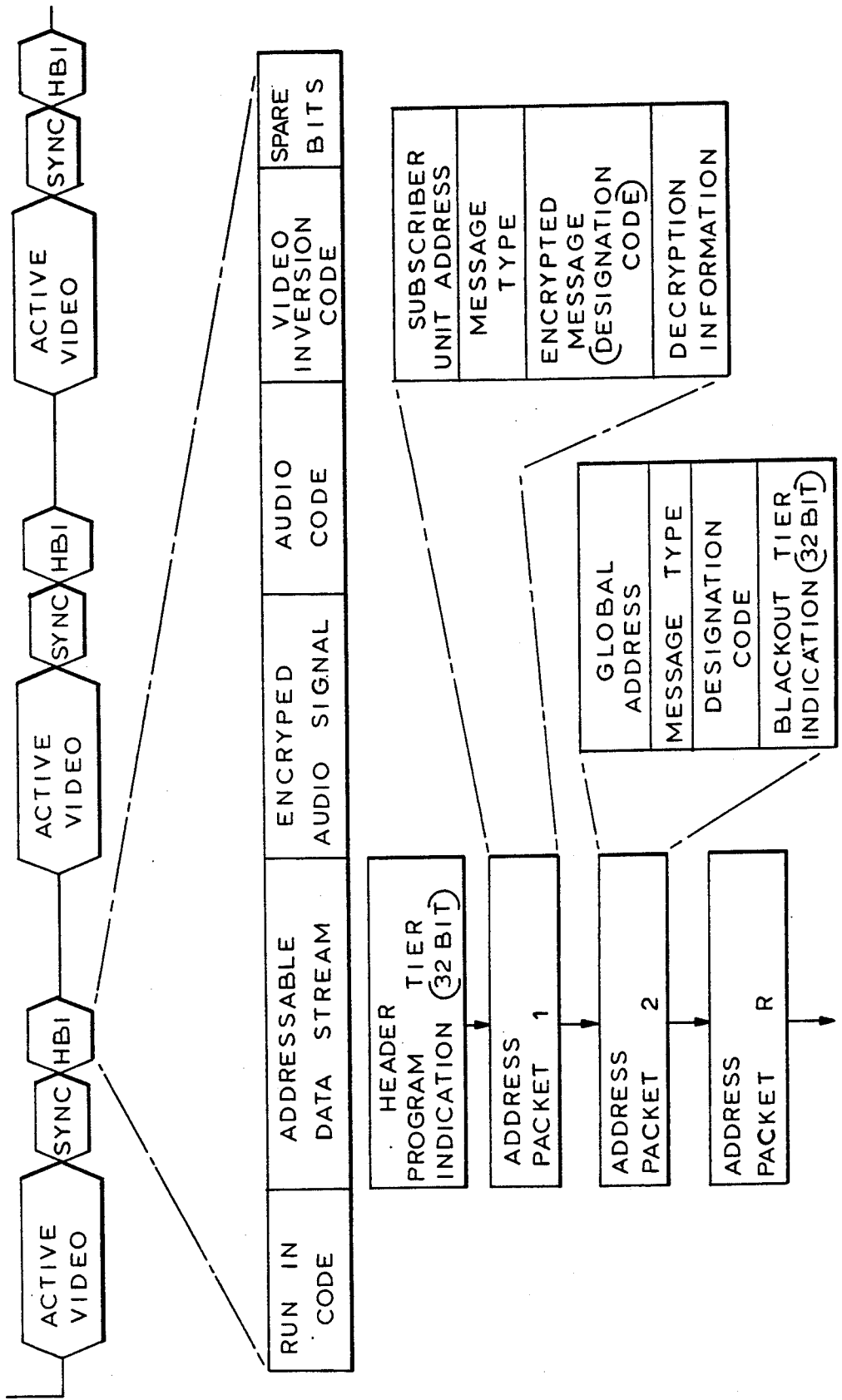
FIG. 5 is a schematic diagram illustrating the composite television broadcast signal distributed through the direct broadcast satellite network in which the present invention is utilized.

FIG. 5 schematically represents the type of composite TV signal distributed by the direct broadcast satellite network. This signal comprises a plurality of active video portions, sync portions, and horizontal blanking interval portions. A data stream, including digitized audio signals and control data, is inserted into consecutive horizontal blanking intervals of the composite television signal.

The data stream includes a run-in code portion, an addressable data stream portion, an encrypted audio signal portion, an audio code portion indicating whether the audio channels being broadcast are stereo or bilingual, a video inversion code required to descramble the video signals, and a spare bit portion. The addressable data stream portion includes a header packet for each program being distributed and a plurality of addressable packets. As mentioned above, global information may be contained in an addressable packet containing a global address, for example, all ones. Information relating to the control of specific receiver units is contained in addressable packets including the unique address number of the particular receiver unit.

Each of the addressable packets includes an address portion, which is either global in nature or specific to a particular subscriber. In packets addressed to specific subscriber units, the address portion is followed by an encrypted message and information which will enable the addressed subscriber unit to decode the message.

Encrypted messages of various types, containing a variety of different kinds of control data, can be distributed in this fashion. For purposes of this application, it is sufficient to understand that one type of encrypted message may be a command to the addressed subscriber unit to load a particular designation code into its designation code memory. Another type of encrypted message may be a command for the subscriber unit to load a particular blocking tier indication into its blocking bit map memory. Still another type of encrypted message may be a command to set the authorization bit map memory with an authorization tier indication.

One type of message is illustrated as addressable packet 1. This packet includes the subscriber unit address for one specific unit, an indication of the message type (i.e., command to set designation code memory), the message (designation code to be stored in memory), and the necessary information for the addressed unit to decrypt the message.

A globally addressed message is illustrated as addressable packet 2. This message contains a global address (meaning it is applicable to all receiver units in the system) and an indication of the message type (a command to set the blackout bit map memory if the designation code in the message matches the designation code previously stored in the designation code memory). This addressable packet also contains a message containing the designation code to be compared and the blackout tier indication to be stored.

After the broadcast of the program to be blacked out, another global message is sent to all receiver units through the data stream. This global message commands all receiver units to reset their respective blackout bit map memories to zero, thereby erasing the blackout information. Once this occurs, the programming on the tier previously designated for blackout will be able to be viewed. In this manner, the blackout bit map memory can be set and reset as required.

While, for simplicity, the present application has discussed the blackout of a single program tier at a time, it should be appreciated that several tiers can be blacked out at the same time by distributing a blackout tier indication which includes "one" bits at locations representing several tiers. For example, blacking out tiers two and four would require a thirty-two bit stream with "ones" at the second and fourth bit. Thus, the term "indication" as used herein refers to a bit stream having ones in positions which correspond to one or more tier numbers.

Figure 6:
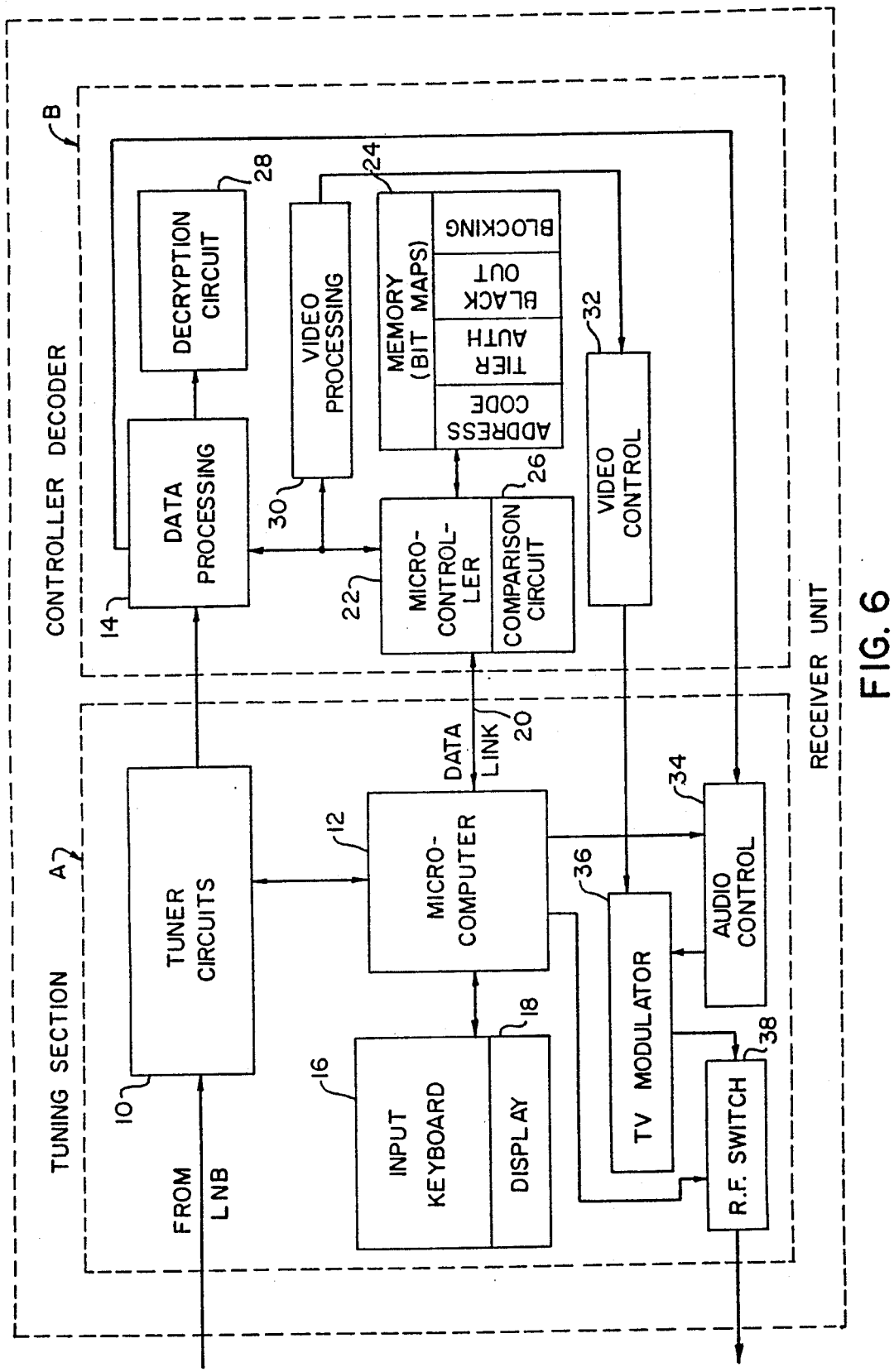
FIG. 6 is a block diagram of the receiver unit of the present invention, including the tuner section and the addressable control decoder section.

FIG. 6 is an overall block diagram of the receiver unit of the present invention. The receiver unit includes a tuner section, generally designated A, which is described in detail in previously mentioned U.S. Pat. No. 4,599,647 and an addressable controller decoder section, generally designated B, which described in detail in the aforementioned U.S. Pat. No. 4,739,510. Tuner section A is connected to receive the output from a Low Noise Block circuit (not shown), operably connected to an antenna (also not shown) for receiving direct broadcast signals from a satellite transponder. Tuner circuits 10 select the frequency of the composite television signal of interest, under the control of microcomputer 12, and transfer the tuned signal of the data processing circuit 14 of decoder B. Microprocessor 12 is linked to an input keyboard 16 and a display 18 such that the user can enter various commands into the receiver and read information from the display. Microcomputer 12 is connected by means of a two way link 20 with the microcontroller 22 of decoder B. Data link 20 permits the tuner section A and the decoder B to communicate with each other as described in detail in U.S. Pat. No. 4,599,647.

Microcontroller 22 controls the various functions of decoder B. Data processing circuit 14 separates the addressed data messages from the remainder of received composite television signal. Microcontroller 22 compares the address information in the addressed message with the address previously stored in memory 24. The comparison takes place in comparison circuits 26. If a match is indicated, the data is decrypted in decryption circuit 28 and either stored in memory 24 or used by comparison circuits 26 to determine if there is an appropriate match which permits the programming to be displayed on a television.

If it is indicated that the program is to be displayed video processing circuit 30 is actuated to process the video signals and transfer them to video control circuit 32. The output from video control circuit 32 is transferred back into tuning section A to the TV modulator circuit 36. The TV modulator circuit 36 also receives the audio signal from audio control circuit 34 which, in turn, receives same from data processing circuit 14. The output of TV monitor circuit 36 is fed through a RF switch 38, controlled by microcomputer 12, to the television.

Memory 24, in addition to the address of the receiver unit, includes memory sections in the form of bit maps for the storage of tier authorization codes, designation codes, blocking codes and blackout codes, as described above. These code memories are preferably in the form of separate bit maps. While memory 24 is illustrated as having different bit map sections, it may in fact encompass several different memories instead of a single memory with different sections designated to store different codes.

It will now be appreciated that the present invention permits all subscriber units located in a particular geographic area to black out a particular program upon the receipt of a given program tier indication associated with the program. This can occur because the particular subscriber units within the geographic area to be blacked out have previously been provided with a given blackout tier indication. The subscriber units within each geographic area have previously been loaded with designation codes representing the area in which the unit is located. Since the designation codes and the blackout tier indications are distributed and stored prior to the broadcast of the programming to be blacked out, this can be done over a relatively long time without disrupting the operation of the system. Setting up the system in this way permits the program to be blacked out in all receiver units within the designated geographic area simultaneously.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims:

We claim:

1. A method for simultaneously preventing the display of a program by selected receiver units in a direct broadcast satellite system of the type including a plurality of receiver units each comprising a tier authorization memory, a designation code memory and a black-out code memory, the method comprising the steps of, prior to the transmission of a program the display of which is to be prevented, separately addressing each receiver unit, providing each addressed receiver unit with a tier authorization code for storage in its tier authorization code memory and providing each addressed receiver unit with a designation code for storage in the designation code memory of the receiver unit, globally addressing all receiver units and transmitting a designation code and a corresponding black-out code, a receiver unit storing the transmitted black-out code in its black-out code memory if the transmitted designation code matches the designation code previously stored in the receiver designation code memory, transmitting a program with a program tier indication, each of the receiver units, upon receiving the transmitted program, comparing the tier indication with the stored black-out code to determine if the program is to be blacked-out, if the program is not to be blacked-out, comparing the transmitted tier indication with the stored tier authorization code to determine if the program is authorized and displaying the program if it is not to be blacked-out and is authorized.

2. The method of claim 1, wherein the provided designation code is transmitted in an encrypted message and wherein the step of storing and designation code comprises the step of decrypting the message to obtain the designation code.

3. The method of claim 2, wherein each of the receiver units has a unique address code and wherein an address code is transmitted along with the encrypted message and further comprising the step of decrypting the encrypted message only if the address code transmitted therewith matches the address code of the receiver.

4. The method of claim 1, wherein the blackout tier indication comprises a plurality of bits and wherein the memory comprises a blackout bit map memory.

5. A method for simultaneously preventing the display of program from all receiver units in a particular geographic area for use in a direct broadcast satellite system of the type including a plurality of receiver units in various geographic areas, each receiver unit having a tier authorization memory, a designation code memory and a black-out bit map memory the method comprising the steps of addressing each receiving unit and providing same with a designation code for storage in the designation code memory of the receiver unit, different designation codes representing different geographic areas and providing a tier authorization for storage in the tier authorization memory of the receiver, selecting each designation code and, for each selected designation code, providing a black-out code to be stored in the black-out bit memory of each receiver unit having the selected designation code stored in the designation code memory of the receiver unit, transmitting a signal comprising a program accompanied by a program tier indication to all receiver units, each receiver unit, upon receiving the signal, comparing the program tier indication and the black code stored in the black-out bit memory to determine if the program is to be blacked-out if the program is not to be blacked-out, comparing the program tier indication with the stored tier authorization code to determine if the program is on an authorized tier, displaying the program if it is not to be blacked-out and is on an authorized tier.

6. The method of claim 5, wherein said signal comprises a data stream comprising a plurality of addressable portions and wherein the step of providing a blackout code comprises the steps of generating an addressable portion addressed to all receiver units and containing a blackout code, and commanding all receiver units having a given stored designation code to store the blackout code.

7. The method of claim 6, wherein each of said receiver units has a unique address and wherein the step of providing a blackout code comprises addressing a message to a particular receiver unit, said message comprising a command to enter a particular designation code into the designation code memory of the addressed unit.

8. A receiver for use in a direct broadcast satellite system of the type including a plurality of receiver units and a transmission station generating a composite television signal including program related information including programs on a plurality of tiers and a data stream including a program tier indication for each program, portions addressable to particular receivers comprising tier authorization codes and designation codes for storage in the addressed receiver units, and globally addressable portions including designation codes and corresponding black-out codes, the receiver unit comprising means for receiving composite television signals, means for locating the portion of the data stream addressed to the particular receiver unit, means for storing a designation code in the addressable portion, means for storing the tier authorization code in the addressable portion, means for locating the globally addressed portion of the data stream containing a designation code corresponding to the stored designation code, means for storing the black-out code in the globally addressed portion associated with a designation code matching the previously stored designation code, means for selecting a program, means for comparing the broadcast program tier indicating for the selecting program with the stored black-out code to determine if the selected program is to be blacked-out, means for comparing the program tier indication with the stored tier authorization code, to determine if the selected program is authorized and means for displaying the selected program if the program is not to be blacked-out and is authorized.

9. The receiver of claim 8 wherein the designation code is transmitted in an encrypted message and wherein the means for storing the designation code comprises means for decrypting the message to obtain the designation code.

10. The receiver of claim 9 wherein each of the receiver units has a unique address code and wherein address code is transmitted as a part of the portions addressable to particular receivers and further comprising means for storing the address code and means for decrypting the encrypted message only if the address code transmitted with the message matches the address code stored in the receiver units address code storage means.

11. The method of claim 8 wherein the black-out code comprises a plurality of bits and wherein the means for storing the black-out code comprises a black-out bit map memory.

* * * * *